(12) United States Patent
McGavock, Jr. et al.

(10) Patent No.: US 12,246,766 B2
(45) Date of Patent: Mar. 11, 2025

(54) CONCEALED ASSET LOCATOR

(71) Applicant: Siemens Mobility, Inc., New York, NY (US)

(72) Inventors: Richard Alan McGavock, Jr., Columbia, MO (US); John Sanders, Valparaiso, IN (US)

(73) Assignee: SIEMENS MOBILITY, INC., New York, NY (US)

( * ) Notice: Subject to any disclaimer, the term of this patent is extended or adjusted under 35 U.S.C. 154(b) by 912 days.

(21) Appl. No.: 17/338,096

(22) Filed: Jun. 3, 2021

(65) Prior Publication Data

US 2022/0388552 A1  Dec. 8, 2022

(51) Int. Cl.
| | |
|---|---|
| *B61L 5/12* | (2006.01) |
| *B61L 5/20* | (2006.01) |
| *B61L 7/06* | (2006.01) |
| *G08B 7/06* | (2006.01) |
| *G10K 9/12* | (2006.01) |
| *H04W 4/02* | (2018.01) |
| *H02S 20/10* | (2014.01) |
| *H04B 1/3827* | (2015.01) |

(52) U.S. Cl.
CPC ............. *B61L 5/125* (2013.01); *B61L 5/20* (2013.01); *B61L 7/06* (2013.01); *G08B 7/06* (2013.01); *G10K 9/12* (2013.01); *H04W 4/023* (2013.01); *H02S 20/10* (2014.12); *H04B 1/3827* (2013.01)

(58) Field of Classification Search
CPC .... B61L 7/06; B61L 5/125; B61L 5/20; B61L 7/00; B61L 5/00; B61L 5/12; B61L 5/18; B61L 5/206; G10K 9/12; H04W 4/023; H02S 20/10; H04B 1/3827
USPC ...................................... 246/473 R
See application file for complete search history.

(56) References Cited

U.S. PATENT DOCUMENTS

| | | | | |
|---|---|---|---|---|
| 5,791,605 A | * | 8/1998 | Howie, II ................ | B60Q 7/00 116/63 P |
| 5,954,299 A | * | 9/1999 | Pace ....................... | B61L 29/24 246/294 |
| 2005/0270175 A1 | * | 12/2005 | Peddie ............. | G08G 1/096783 246/473 R |
| 2016/0205654 A1 | * | 7/2016 | Robinson, Jr. ........ | H04W 4/024 455/456.3 |

* cited by examiner

*Primary Examiner* — Zachary L Kuhfuss
*Assistant Examiner* — Heaven R Buffington

(57) ABSTRACT

A concealed asset locator includes an enclosure with multiple external surfaces, wherein an external surface is configured as reflective surface, an electric notification device, a receiver relay positioned inside the enclosure and electrically coupled to the notification device, wherein the receiver relay is configured to activate the notification device in response to a received transmitter signal.

7 Claims, 2 Drawing Sheets

CONCEALED ASSET LOCATOR

BACKGROUND

1. Field

Aspects of the present disclosure generally relate to a concealed asset locator and a concealed asset location system, in particular in connection with railroad equipment, such as for example railroad crossing and signalling products that require a physical connection to railroad tracks.

2. Description of the Related Art

Railroad equipment, such as railroad crossing and signalling devices, typically require wired or other physical connections to one or more railroad tracks. These devices may be in a housing, directly adjacent to the railroad tracks, or buried between rails of the railroad tracks. When troubleshooting an issue, locating these devices and track connections in a timely manner is paramount. This can be difficult to do at night or during adverse weather conditions, especially after snowfall.

Known methods for finding assets or devices along railroad tracks include for example marking rails with spray paint, walking rails until the asset is found, and referring to track designs to determine distances to them. In cases where personnel are familiar with the territory, landmarks may be used.

SUMMARY

Briefly described, aspects of the present disclosure relate to a concealed asset locator and a concealed asset location system, used for example in connection with railroad equipment, such as railroad crossing and signalling products. However, it should be noted that the concealed asset locator and the concealed asset location system can be used in connection with many other assets, i. e. devices or products, that may be concealed by environmental conditions and need to be located.

A first aspect of the present disclosure provides a concealed asset locator comprising an enclosure comprising multiple external surfaces, wherein at least one of the multiple surfaces is configured as reflective surface, an electric notification device, a receiver relay positioned inside the enclosure and electrically coupled to the notification device, wherein the receiver relay is configured to activate the notification device in response to a received transmitter signal.

A second aspect of the present disclosure provides a concealed asset location system comprising a stationary concealed asset locator comprising an enclosure, an electric notification device, a receiver positioned inside the enclosure and electrically coupled to the notification device, a first portable wireless device, wherein the receiver is configured to activate the notification device in response to a received transmitter signal of the first portable wireless device.

DETAILED DESCRIPTION

To facilitate an understanding of embodiments, principles, and features of the present disclosure, they are explained hereinafter with reference to implementation in illustrative embodiments. In particular, they are described in the context of a concealed asset locator and a concealed asset location system.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
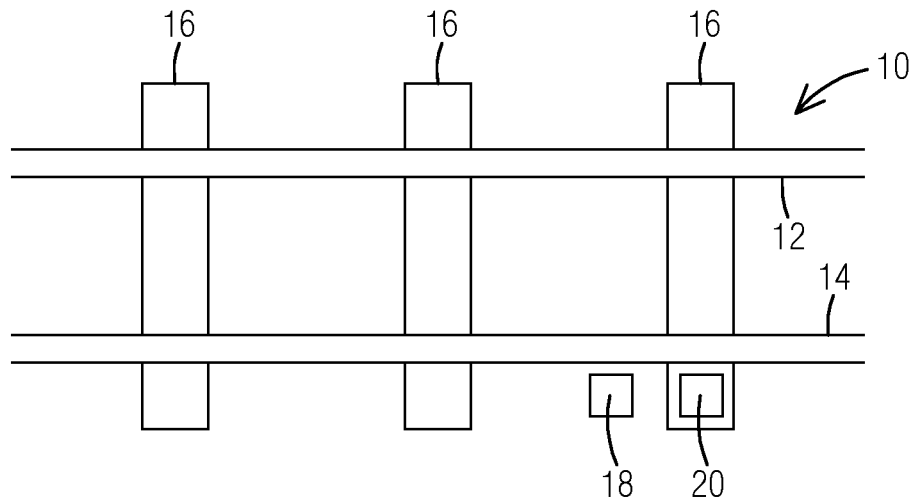
FIG. 1 illustrates a schematic of a railroad track including a concealed asset locator in accordance with an exemplary embodiment of the present disclosure.

FIG. 1 illustrates a schematic of a railroad track including a concealed asset locator in accordance with an exemplary embodiment of the present disclosure. Railroad track 10 includes rails 12, 14, which are supported by a plurality of railroad ties 16. Railroad ties 16 are laid perpendicular to the rails 12, 14 and transfer loads to a track ballast and subgrade, hold the rails 12, 14 upright and keep them spaced to a correct gauge.

Many railroad devices, specifically at railroad crossings, require wired or other physical connections to the railroad track 10. FIG. 1 shows an example device 18, also referred to as asset 18, located adjacent to the track 10, specifically adjacent to rail 14. Asset 18 can be for example a relay utilized in connection with a constant warning time device, also known as grade crossing predictor (GCP), or a wheel counter, or another type of railroad device. Asset 18 may be buried in the ground. When troubleshooting an issue of the asset 18, locating the asset 18 in a timely manner is paramount, and it can be difficult to do at night or during adverse weather conditions. Thus, a concealed asset locator 20 is provided, designed to help locate the asset 18 along the track 10. The term 'concealed asset' as used herein refers to the device or apparatus, e. g. asset 18, that may be hidden or covered, for example in a housing or buried underground. The concealed asset locator 20 is in close proximity to the asset 18 and can be mounted directly to the railroad tie 16 closest to the asset 18.

Other examples of the device 18 include termination shunts, GCP track connections, motion sensor (MS) track connections, geographic signalling system (GEO) track connections, track circuit receivers and transmitters, phase shift overlay (PSO) track circuit components, wheel counters, and many other products and devices requiring a track connection.

Further, it should be noted that asset 18 as illustrated in connection with FIG. 1 is only an example and may not be a railroad asset. The concealed asset locator 20 can be used in connection with many other devices that are concealed by environmental conditions and need to be located, such as for example electric/electronic devices in connection with power distribution/transmission.

Figure 2:
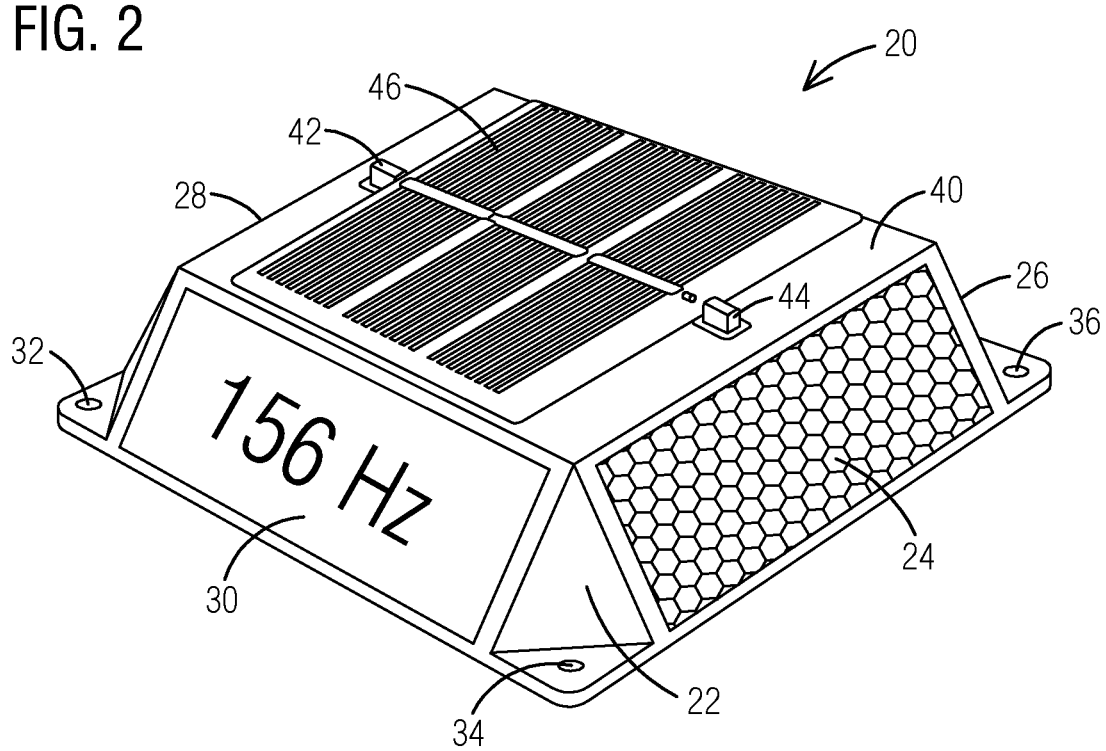
FIG. 2 illustrates a 3-dimensional view of a concealed asset locator in accordance with an exemplary embodiment of the present disclosure.

FIG. 2 illustrates a 3-dimensional view of a concealed asset locator in accordance with an exemplary embodiment of the present disclosure.

The concealed asset locator 20, herein also referred in short as locator 20, comprises an enclosure 22 with multiple external surfaces. At least one of the multiple surfaces is configured as reflective surface 24. In our example, the locator 20 comprises three reflective surfaces 24, 26, 28 (reflective surfaces 26, 28 cannot be seen in the view of FIG. 2). Further, the locator 20 can comprise a writable surface 30, wherein information with respect to the (concealed) asset 18, e. g. relay, can be written on the surface 30 and displayed accordingly.

The locator 20, specifically the enclosure 22, comprises multiple attachment points 32, 34, 36 for mounting the concealed asset locator 20 to another structure, such as for example a railroad tie 16. The locator 20 can comprise one or more attachment points, depending for example on the type of attachment means. Attachment points 32, 34, 36 may be configured as holes so that the locator 20 can be mounted via screws or bolts to tie 16 or another type of structure. Other types of structures can be for example a wall of a building or another housing.

In an exemplary embodiment, the locator 20 comprises an electric notification device, which can be internal and/or external to the enclosure 22. Electric notification device as used herein comprises a device that emits or broadcasts visual and/or audio signals to help locate the concealed asset 18 in connection with the locator 20.

In an exemplary embodiment, the electric notification device comprises one or more lights or lamps, mounted at one or more of the external surfaces of the enclosure 22. For example, at least one light emitting diode (LED) is positioned at one of the multiple external surfaces. With reference to FIG. 2, two LEDs 42, 44 are positioned and mounted at top surface 40 of the enclosure 22. Of course, the locator 20 may comprise one light or LED or may comprise many lights or LEDs, for example 10 LEDs, arranged at different external surfaces and/or in various patterns. In another exemplary embodiment, the electric notification comprises an audio or sound emitting device, such as for example a buzzer.

Further, the locator 20 may comprise one or more solar panels 46, positioned at one of the multiple external surfaces, for example top surface 40. The one or more solar panels 46 can be configured to recharge a power source of the locator 20. Audio device and power source may be positioned inside the enclosure 22 and will be described in more detail with reference to FIG. 3.

Figure 3:
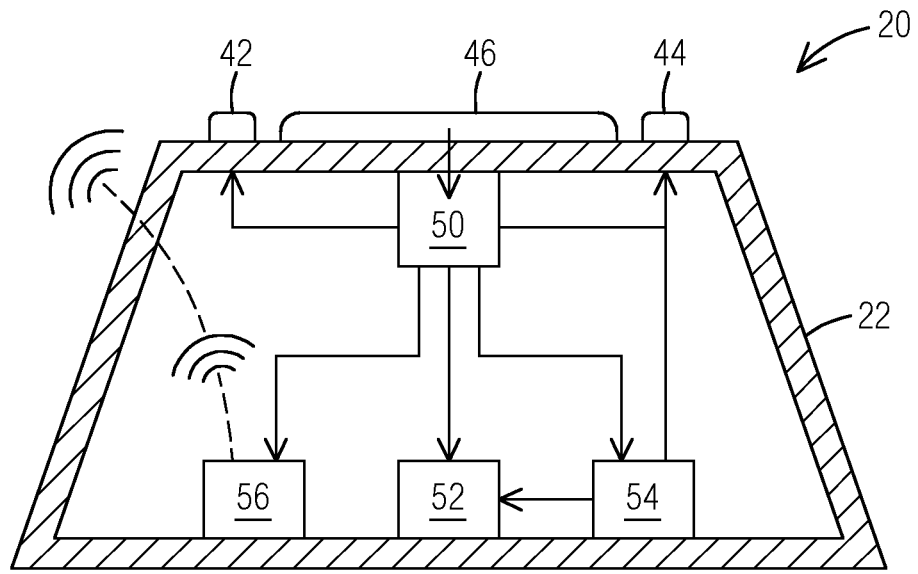
FIG. 3 illustrates a cross-section view of a concealed asset locator in accordance with an exemplary embodiment of the present disclosure.

FIG. 3 illustrates a cross-section view of a concealed asset locator in accordance with an exemplary embodiment of the present disclosure.

As noted above, the locator 20 comprises a power source 50, which can be positioned inside the enclosure 22. The power source 50 can be a battery, specifically a rechargeable battery, such as a rechargeable Lithium-ion (Li-ion) battery. The power source 50 is rechargeable by the solar panel(s) 46.

Further, the locator 20 comprises one or more electric notification devices inside the enclosure 22, such as for example audio device 52. The power source 50 is configured to electrically power the audio device 52, as well as the LEDs 42, 44, demonstrated by the various arrows.

In a further embodiment, the locator 20 comprises a receiver relay 54 positioned inside the enclosure 22 and electrically coupled to the electric notification device(s), e. g. LED(s) 42, 44 and/or audio device 52. The receiver relay 54 is configured to activate or trigger the LED(s) 42, 44 and audio device 52, specifically in response to a received transmitter signal. The receiver relay 54 is powered by the power source 50. Receiver relay 54 as used herein includes a device, switch or mechanism configured to activate or trigger one or more components of the locator 20, such as the electric notification device(s). Activation or triggering can be based upon a received signal of another device.

It should be noted that the concealed asset locator 20 may comprise one or multiple electric notification device(s), e. g. LED(s) 42, 44, and/or audio device 52. Other types of notification devices may be included in the locator 20.

In another exemplary embodiment, the concealed asset locator 20 comprises a wireless transmitter, such as a wireless beacon 56. The beacon 56 can be inside the enclosure 22. The beacon 56 transmits wirelessly signals, referred to as for example homing signals, to other devices nearby for location purposes. Beacon 56 uses low-energy technology, for example Bluetooth® technology, or other types of low-energy technology. Beacon 56 is powered by power source 50.

Figure 4:
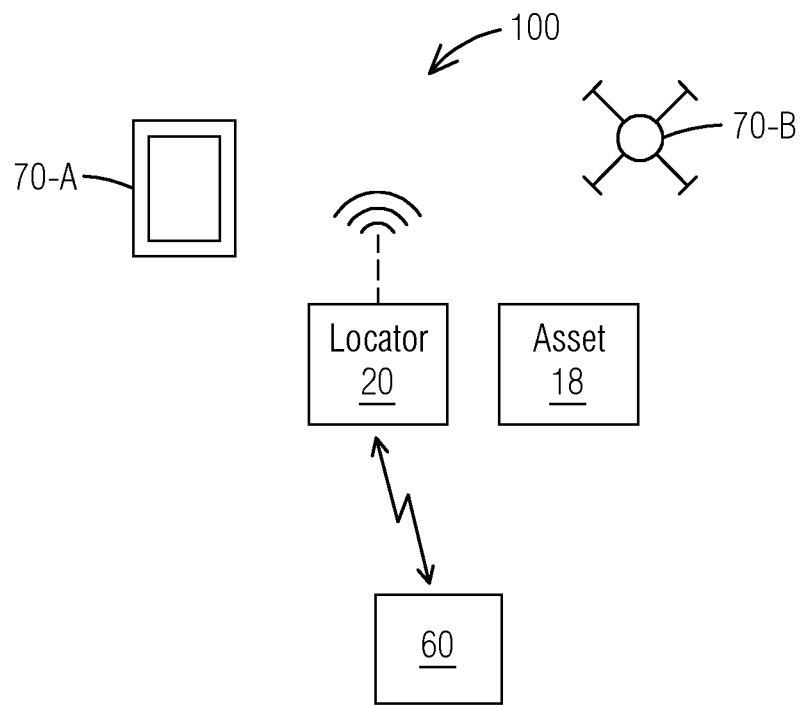
FIG. 4 illustrates a simplified schematic of a concealed asset location system in accordance with an exemplary embodiment of the present disclosure.

FIG. 4 illustrates a simplified schematic of a concealed asset location system in accordance with an exemplary embodiment of the present disclosure. Concealed asset location system 100 comprises concealed asset locator 20, as described for example with reference to FIGS. 1-3.

As noted, the locator 20 may comprise a wireless beacon 56, and one or more an electric notification device(s) 42, 44 and 52. The notification device(s) 42, 44, 54 are activated via a receiver positioned inside the enclosure and electrically coupled to the notification device(s) 42, 44, 52, such as for example receiver relay 54.

The system 100 further comprises a first portable wireless transmitter 60 configured to transmit signals, for example radio frequency (RF) signals, wherein the receiver relay 54 is configured to receive the RF signals and to active or trigger the notification device(s) 42, 44, 52 accordingly. The first portable wireless transmitter 60 can be a wireless keychain transmitter including for example a push button. While the keychain transmitter button is pressed, the receiver relay 54 triggers the notification device(s), e. g. LED(s) 42, 44 and audio device 52. This will assist the keychain user in finding the asset 18. In an example, the push button can be designed to activate the notification device(s) of the locator 20 only when held down to prevent a permanent on-state that would drain either the battery of the transmitter 60 or the power source 50 of the locator 20.

Further, a single keychain transmitter 60 activates any concealed asset locator 20 in range, specifically any receiver (e. g. receiver relay 54) that is set to a same RF frequency. In an example, there may be more than one locator 20 in range, and the keychain transmitter 60 will active all receivers of all locators in range and tuned to the same RF frequency when pressing the push button.

In another embodiment, transmitter(s), e. g. transmitter 60, and receiver(s), e. g. receiver relay 54, are frequency selectable. This means that a frequency, for example RF frequency, of first transmitter(s) and receiver(s) can be set to a first frequency that is different to a second frequency of second transmitter(s) and receiver(s). Different frequencies can be useful in situations where there are overlapping track circuits and railroad personnel needs to determine which asset belongs to which track circuit. Different frequencies may be set via a dip switch on the devices themselves, via a wireless configuration method, or pre-set during manufacturing. Further, in case that pre-set frequencies are used, equipment of a specific frequency may be color coded to differentiate between equipment with different frequencies. For example, equipment (receiver/transmitter) pre-set to a first RF frequency may comprise housing/cases that are colored in red, wherein equipment pre-set to a second RF frequency may comprise housings/cases colored in green.

In another embodiment, the concealed asset location system 100 comprises a second portable wireless device 70-A. The second portable wireless device 70 is configured to receive low-energy signals transmitted by the wireless beacon 56 of the concealed asset locator 56 for location purposes. The second portable device 70 can be for example a smartphone, tablet or other portable interface device. In another example, the second portable device 70 can be an unmanned aerial vehicle (UAV), commonly known as drone 70-B. The drone 70-B is configured to locate the locator 20 and the adjacent asset 18, based on the low-energy signals, for example Bluetooth® signals, transmitted by the beacon 56. Thus, the drone 70-B is configured to receive low-energy signals. For example, the drone 70-B can be sent to the asset 18/locator 20 for surveyance, inspection and/or maintenance purposes of the asset 18. Further, the second portable device 70-A, 70-B can be configured to receive data through the low-energy wireless signal, wherein the data provides characteristics of the asset 18 that is paired with the concealed asset locator 20. Such data may comprise for example relay settings, serial numbers, model numbers, etc., wherein the data can be selected and set via dip switch on the concealed asset locator hardware, via a wireless configuration method, or pre-set during manufacturing of the locator 20.

The invention claimed is:

1. A concealed asset location system comprising:
 a stationary concealed asset locator comprising
  an enclosure,
  an electric notification device,
  a receiver positioned inside the enclosure and electrically coupled to the electric notification device,
 a concealed asset in proximity to the stationary concealed asset locator, the concealed asset including a railroad equipment device located along a railroad track,
 a first portable wireless device transmitter,
 wherein the receiver is configured to activate the electric notification device in response to a received transmitter signal of the first portable wireless transmitter,
 wherein the first portable wireless transmitter and the receiver are configured to transmit or receive radio frequency (RF) signals, and
 wherein the first portable wireless transmitter is configured to activate the receiver and further receivers of stationary concealed asset locators that are set to a same radio frequency.

2. The concealed asset location system of claim 1, comprising:
 a second portable wireless device,
 wherein the second portable wireless device is configured to receive low-energy signals transmitted by a wireless beacon of the stationary concealed asset locator.

3. The concealed asset location system of claim 2, comprising:
 wherein the second portable wireless device is configured to receive data relating to the asset paired with the concealed asset locator via the wireless beacon.

4. The concealed asset location system of claim 2, wherein the second portable wireless device comprises a smartphone, tablet, or portable interface device.

5. The concealed asset location system of claim 2, wherein the second portable wireless device comprises an unmanned aerial vehicle (UAV).

6. The concealed asset location system of claim 1, wherein the stationary concealed asset locator is mounted to another structure.

7. The concealed asset location system of claim 1, wherein the stationary concealed asset locator is mounted to a railroad tie of a railroad track.

* * * * *